No. 830,816. PATENTED SEPT. 11, 1906.
F. C. G. ZIMMERMANN.
WAGON ATTACHMENT.
APPLICATION FILED JAN. 4, 1906.
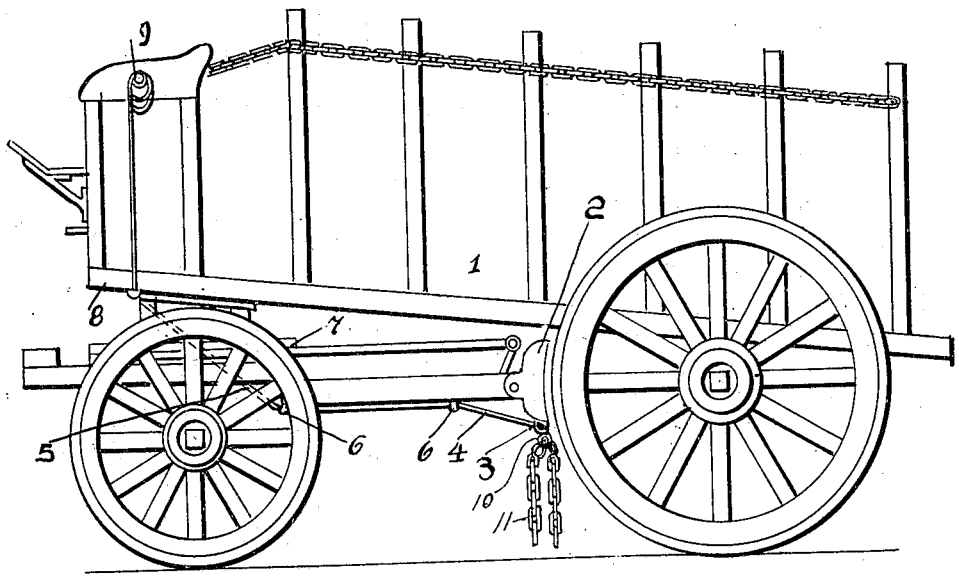
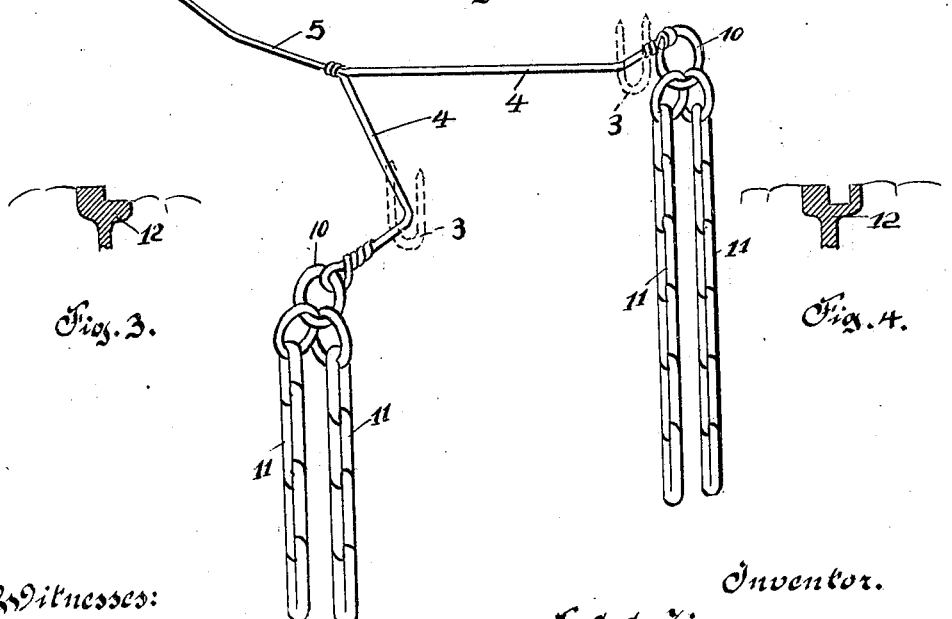
Witnesses:
Inventor.
F. C. G. Zimmermann.

UNITED STATES PATENT OFFICE.

FREDERICK C. G. ZIMMERMANN, OF PITTSBURG, PENNSYLVANIA.

WAGON ATTACHMENT.

No. 830,816.
Specification of Letters Patent.
Patented Sept. 11, 1906.

Application filed January 4, 1906. Serial No. 294,498.

*To all whom it may concern:*

Be it known that I, FREDERICK C. G. ZIMMERMANN, a citizen of the United States of America, residing at Pittsburg, in the county of Allegheny and State of Pennsylvania, have invented certain new and useful Improvements in Attachments for Wagons and Vehicles, of which the following is a specification, reference being had therein to the accompanying drawings.

This invention relates to certain new and useful improvements in attachments for vehicles, and the invention relates more particularly to a vehicle-replacer.

The primary object of this invention is the provision of a novel form of attachment for vehicles whereby the vehicle when it has run into a rut or the like groove can be easily and quickly removed from the rut or groove and replaced upon solid and uninterrupted ground.

To this end my invention aims to provide an attachment which can be easily carried by large and heavy wagons or drays, the attachment being easily and quickly manipulated to place it in position when it is desired to replace the wheels of the vehicle upon uninterrupted ground.

With the above and other objects in view, which will more readily appear as the nature of the invention is better understood, the same consists in the novel construction, combination, and arrangement of parts to be hereinafter more fully described and claimed, and, referring to the drawings accompanying this application, like numerals of reference designate corresponding parts throughout the several views, in which—

Figure 1 is a side elevation of a wagon equipped with my improved attachment. Fig. 2 is a perspective view of the attachment. Figs. 3 and 4 are detail sectional views of tracks in connection with which my improved attachment may be readily used.

In the accompanying drawings I have illustrated a large and heavy wagon or dray 1 as being equipped with the ordinary brake-shoes 2, which are employed to frictionally engage the rear wheels of the wagon or dray and retard them in their movement.

My invention resides in providing the brake-shoes 2 with depending eyelets or hooks 3, through which pass the ends of cables 4 4, that are connected to the main cable 5, said cable passing through eyelets or hooks 6 6, carried by the running-gear of the wagon and having its opposite end passing upwardly through the fifth-wheel 7 and the bed 8 of the wagon to a place, as at 9, convenient to the driver of the wagon. The opposite ends of the cables are connected to links 10 10, and each link supports two chains 11 11, said chains being of such a length as not to drag upon the ground or surface over which the wagon passes when the links 10 are drawn into engagement with the eyelets or hooks 3.

It is a well-known fact that when a large and heavy wagon travels in the tracks 12 12 of a railway it is often impossible when turning out of a track to remove the rear wheels from the tread of said tracks, this being occasioned by the safety-flange of the tracks, especially a curved track or the street blocks which extend upwardly upon each side of an ordinary track. For this reason I have used the chains 11 11, which are lowered upon the tracks 12 12 when it is desired to move the wagon off of the track, it being observed that when the chains are lowered upon the tread of the tracks the rear wheels of the wagon can readily surmount the chains and move off of the tracks 12 12. The cable 5 is made of a sufficient length that it can be paid out to permit of the wheels passing over the chains, at which time the chains can be elevated to the position shown in Fig. 1 of the drawings. It will of course be understood that strong and durable chains are employed which will withstand the pressure of a loaded wagon or dray and that rope or wire cables may be used for manipulating the same.

Such changes in the construction of my improved attachment as are permissible by the appended claims may be resorted to without departing from the spirit and scope of the invention.

What I claim, and desire to secure by Letters Patent, is—

1. In an attachment, the combination with the brake-shoes of a vehicle, of cables supported from said brake-shoes, chains carried by the one end of each cable, a cable connected to the opposite ends of said cables, and extending forward to the front end of said vehicle, substantially as described.

2. In an attachment, the combination with the brake-shoes of a vehicle, of chains suspended from said brake-shoes, and means to raise and lower said chains, substantially as described.

3. The combination in a vehicle attachment of the type described, of supporting-eyelets, cables working freely through said eyelets and connected together at their one end, an operating-cable connected to the first-mentioned cables, rings carried in the free ends of said cables, and chains suspended from said rings.

In testimony whereof I affix my signature in the presence of two witnesses.

FREDERICK C. G. ZIMMERMANN.

Witnesses:
    E. E. POTTER,
    C. KLOSTERMANN.